United States Patent
Parikh

(10) Patent No.: US 10,829,122 B2
(45) Date of Patent: Nov. 10, 2020

(54) OVERTAKE ACCELERATION AID FOR ADAPTIVE CRUISE CONTROL IN VEHICLES

(71) Applicant: Robert Bosch GmbH, Stuttgart (DE)

(72) Inventor: Sameer Parikh, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 16/309,723

(22) PCT Filed: Jun. 9, 2017

(86) PCT No.: PCT/EP2017/064083
§ 371 (c)(1),
(2) Date: Dec. 13, 2018

(87) PCT Pub. No.: WO2017/216048
PCT Pub. Date: Dec. 21, 2017

(65) Prior Publication Data
US 2019/0135292 A1 May 9, 2019

Related U.S. Application Data

(60) Provisional application No. 62/351,630, filed on Jun. 17, 2016.

(51) Int. Cl.
*B60W 30/18* (2012.01)
*G01S 13/86* (2006.01)
(Continued)

(52) U.S. Cl.
CPC .... *B60W 30/18163* (2013.01); *B60W 30/143* (2013.01); *G01S 13/862* (2013.01);
(Continued)

(58) Field of Classification Search
CPC ......... B60W 30/18163; B60W 30/143; B60W 2540/215; B60W 2554/804;
(Continued)

(56) References Cited

U.S. PATENT DOCUMENTS 6,370,475 B1 * 4/2002 Breed .................. G01S 13/931
701/301
6,580,385 B1 * 6/2003 Winner ................ G01S 13/865
342/70

(Continued)

FOREIGN PATENT DOCUMENTS

| EP | 2042399 A2 | 4/2009 |
|---|---|---|
| JP | 2013180606 A | 9/2013 |
| JP | 2016088504 A | 5/2016 |

OTHER PUBLICATIONS

International Search Report and Written Opinion for PCT Application No. PCT/EP2017/064083 dated Sep. 26, 2017 (11 pages).

(Continued)

*Primary Examiner* — Justin M Jonaitis
(74) *Attorney, Agent, or Firm* — Michael Best & Friedrich LLP

(57) ABSTRACT

Adaptive cruise control systems and methods of providing overtake acceleration aid in host vehicles. In one embodiment, the adaptive cruise control system includes an ultrasonic sensor, a radar sensor, a camera, and an electronic controller. The ultrasonic sensor, the radar sensor, and the camera are configured to sense within fields-of-view of a neighboring lane. Responsive to receiving an input indicating an overtake request, the electronic controller is configured determine when an object is located in the neighboring lane based in part on first data received from the ultrasonic sensor. The electronic controller is also configured to determine a velocity of the object when the object is located within the field-of-view of the radar sensor or the camera. The electronic controller is further configured to determine an overtake acceleration boost based in part on the velocity of the object and apply the overtake acceleration boost to the host vehicle.

20 Claims, 8 Drawing Sheets

(51) Int. Cl.
B60W 30/14 (2006.01)
G01S 13/931 (2020.01)

(52) U.S. Cl.
CPC .......... *G01S 13/867* (2013.01); *G01S 13/931* (2013.01); *B60W 2420/42* (2013.01); *B60W 2420/52* (2013.01); *B60W 2420/54* (2013.01); *B60W 2540/215* (2020.02); *B60W 2554/804* (2020.02); *G01S 2013/9315* (2020.01); *G01S 2013/9319* (2020.01)

(58) Field of Classification Search
CPC ......... B60W 2420/42; B60W 2420/52; B60W 2420/54; G01S 13/862; G01S 13/867; G01S 13/931; G01S 2013/9315; G01S 2013/9319
USPC .......................................................... 701/93
See application file for complete search history.

(56) References Cited

U.S. PATENT DOCUMENTS

| | | | | |
|---|---|---|---|---|
| 9,475,491 | B1* | 10/2016 | Nagasaka | B60W 30/18163 |
| 9,487,212 | B1* | 11/2016 | Adam | B60W 30/143 |
| 2003/0204299 | A1* | 10/2003 | Waldis | B60K 31/0058 |
| | | | | 701/96 |
| 2004/0107030 | A1* | 6/2004 | Nishira | B60W 50/14 |
| | | | | 701/36 |
| 2008/0154629 | A1* | 6/2008 | Breed | B60N 2/2863 |
| | | | | 705/1.1 |
| 2009/0088925 | A1* | 4/2009 | Sugawara | B60W 30/12 |
| | | | | 701/41 |
| 2015/0360721 | A1* | 12/2015 | Matsuno | B60W 31/18163 |
| | | | | 701/41 |

OTHER PUBLICATIONS

Office Action from the Japanese Patent Office for Application No. 2018-565342 dated Sep. 2, 2019 (7 pages).

* cited by examiner

OVERTAKE ACCELERATION AID FOR ADAPTIVE CRUISE CONTROL IN VEHICLES

RELATED APPLICATIONS

This application claims priority to U.S. Provisional Application No. 62/351,630, entitled "OVERTAKE ACCELERATION AID FOR ADAPTIVE CRUISE CONTROL IN VEHICLES," filed Jun. 17, 2016, the entire contents of which is incorporated herein by reference.

BACKGROUND

The present disclosure relates to systems and methods of providing overtake acceleration aid in vehicles.

Adaptive cruise control systems in vehicles provide overtake acceleration aid when drivers show an intention to overtake a slow moving vehicle. Many current adaptive cruise control systems use radar sensors and/or camera systems to track vehicles in neighboring lanes. The field-of-views of radar sensors and camera systems are narrow at distances close to the host vehicle. As such, close range object detection using radar sensors and camera systems is limited.

Vehicle tracking in neighboring lanes may be improved significantly by using more accurate dedicated front corner sensors, such as corner radar sensors. A corner radar sensor is a radar sensor that points in the direction of the neighboring lane to determine neighboring lane behavior even at close range. However, front corner sensors are expensive and are not typically included in the majority of vehicles.

SUMMARY

Many vehicles that include advanced driver assistant systems, such as adaptive cruise control, are equipped with front ultrasonic sensors. The embodiments described herein provide, among other things, adaptive cruise control systems with improved close range object detection for overtake acceleration aid using ultrasonic sensors.

One embodiment provides an adaptive cruise control system for a host vehicle. In one embodiment, the adaptive cruise control system includes an ultrasonic sensor, a radar sensor, a camera, and an electronic controller. The ultrasonic sensor is configured to sense within a first field-of-view of a neighboring lane and generate first. The radar sensor is configured to sense within a second field-of-view of the neighboring lane. The camera is configured to sense within a third field-of-view of the neighboring lane. The electronic controller is configured to receive an input indicating an overtake request. Responsive to receiving the input, the electronic controller is configured determine when an object is located in the neighboring lane based in part on the first data received from the ultrasonic sensor. The electronic controller is also configured to determine a velocity of the object when the object is located within at least one selected from a group consisting of the second field-of-view of the neighboring lane and the third field-of-view of the neighboring lane. The electronic controller is further configured to determine a first overtake acceleration boost based in part on the velocity of the object. The electronic controller is also configured to apply the first overtake acceleration boost to the host vehicle via a throttle system of the host vehicle.

Another embodiment provides an adaptive cruise control system for a host vehicle. In one embodiment, the adaptive cruise control system includes an ultrasonic sensor, a non-ultrasonic sensor, and an electronic controller. The ultrasonic sensor is configured to sense within a first field-of-view of a neighboring lane and generate first data. The non-ultrasonic sensor is configured to sense within a second field-of-view of the neighboring lane. The electronic controller is configured to receive an input indicating an overtake request. Responsive to receiving the input, the electronic controller is configured determine when an object is located in the neighboring lane based in part on the first data received from the ultrasonic sensor. The electronic controller is also configured to determine a velocity of the object when the object is located within the second field-of-view of the neighboring lane. The electronic controller is further configured to determine a first overtake acceleration boost based in part on the velocity of the object. The electronic controller is also configured to apply the first overtake acceleration boost to the host vehicle via a throttle system of the host vehicle.

Yet another embodiment provides a method of providing overtake acceleration aid in a host vehicle. The method includes receiving, with an electronic controller, an input indicating an overtake request. The method also includes receiving, with the electronic controller, first data from an ultrasonic sensor of the host vehicle and second data from a non-ultrasonic sensor of the host vehicle. The method further includes detecting, with the electronic controller, an object in a neighboring lane based in part on the first data. The method also includes determining, with the electronic controller, a velocity of the object when the object is detected by the non-ultrasonic sensor of the host vehicle. The method further includes determining, with the electronic controller, a first overtake acceleration boost based in part on the velocity of the object. The method also includes applying the first overtake acceleration boost to the host vehicle via a throttle system of the host vehicle.

Other aspects and embodiments will become apparent by consideration of the detailed description and accompanying drawings.

DETAILED DESCRIPTION

Figure 1:
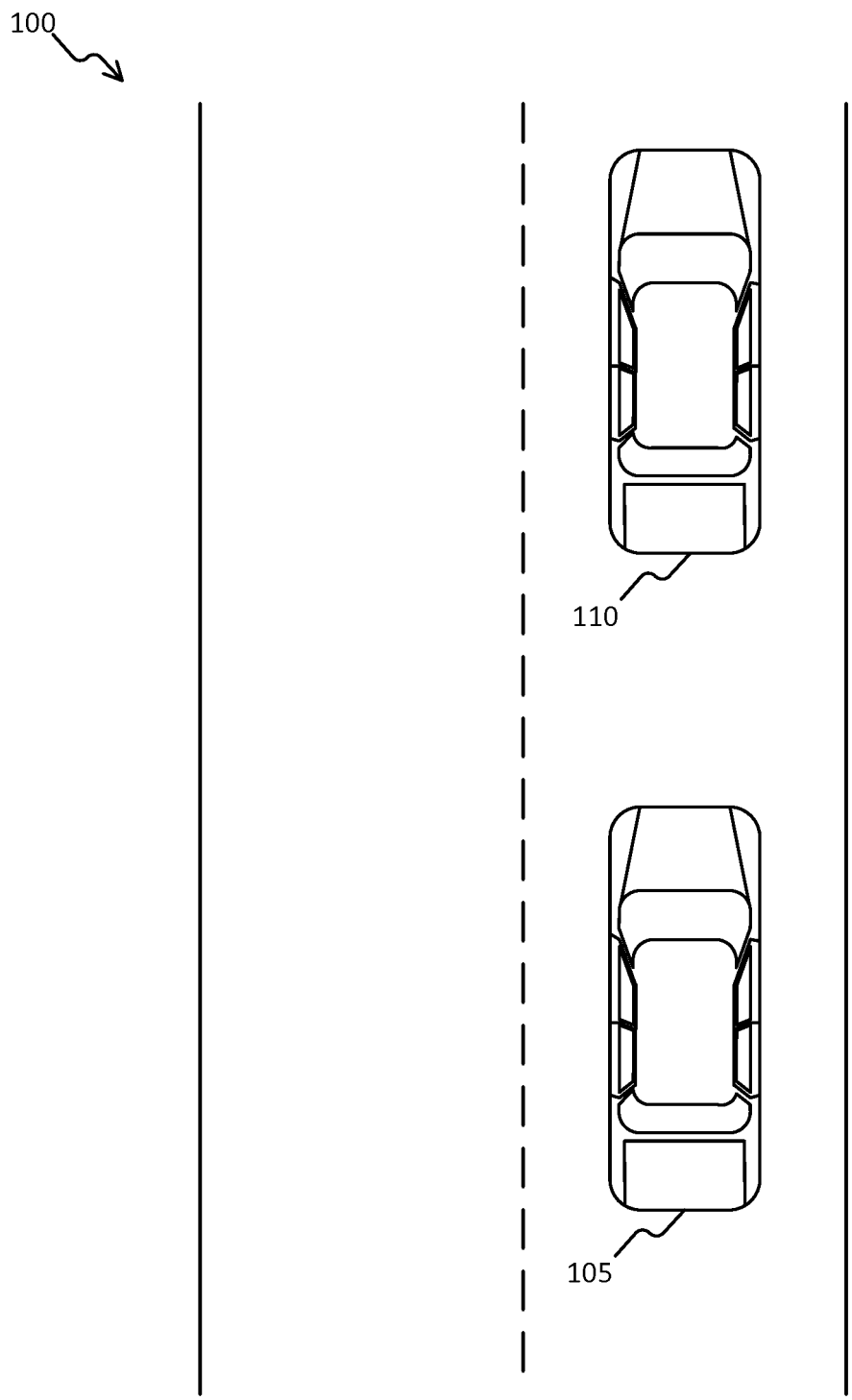
FIG. 1 is a diagram of a driving situation in which a host vehicle approaches a slow moving vehicle from behind.

Before any embodiments are explained in detail, it is to be understood that no embodiment is necessarily limited in its application to the details of construction and the arrangement of components set forth in the following description or illustrated in the following drawings. Other embodiments are possible and embodiments described are capable of being practiced or of being carried out in various ways.

It should also be noted that a plurality of different structural components may be utilized to implement the disclosure. Furthermore, and as described in subsequent paragraphs, the specific configurations illustrated in the drawings are intended to exemplify certain embodiments. Alternative configurations are possible.

For ease of description, the example systems presented herein may be illustrated with a single exemplar of each of their component parts. Some examples may not describe or illustrate all components of the systems. Other example embodiments may include more or fewer of each of the illustrated components, may combine some components, or may include additional or alternative components.

Figure 2:
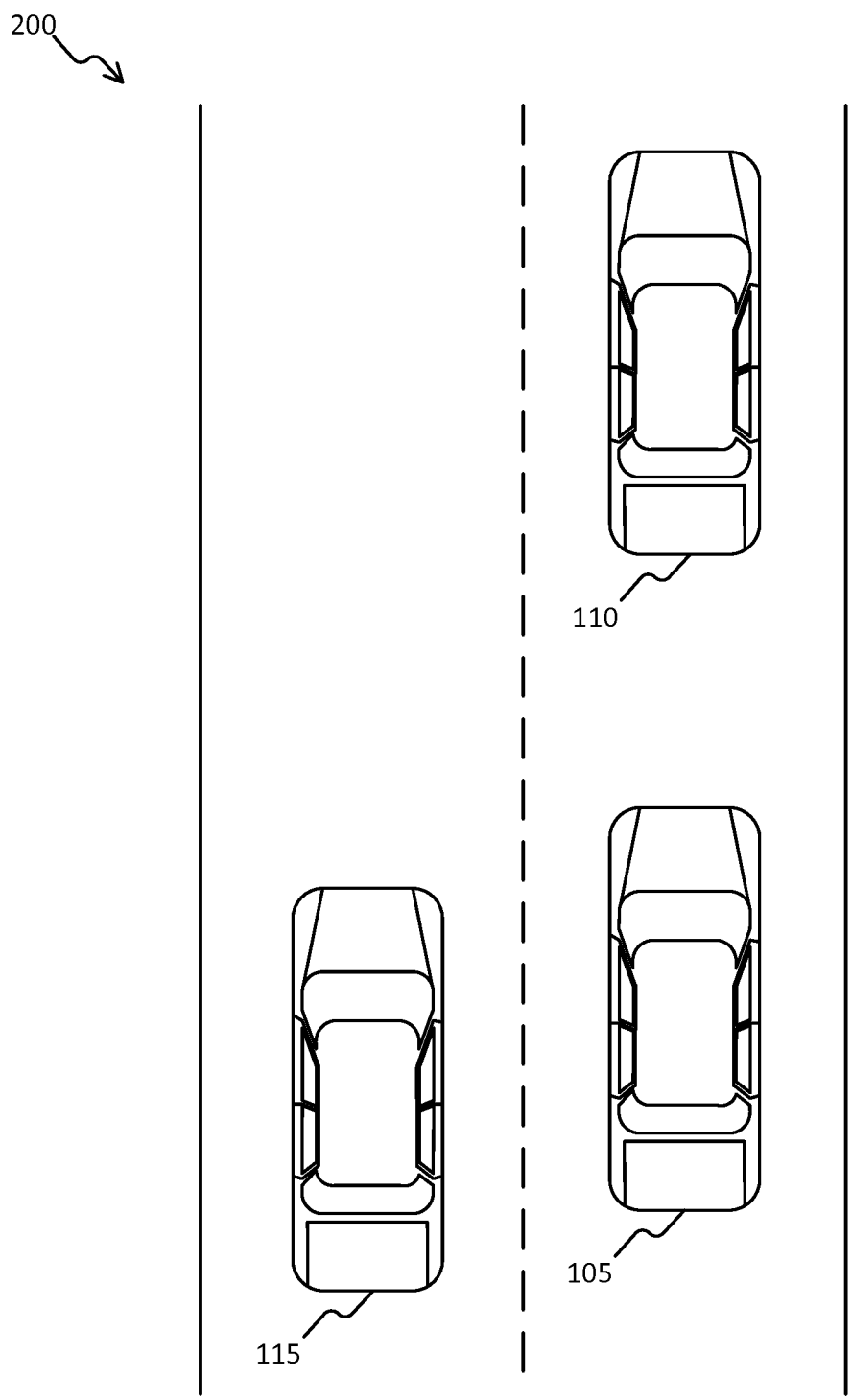
FIG. 2 is a diagram of a driving situation in which a neighboring vehicle is located within a blind spot of a host vehicle.

Referring to an example driving situation 100 illustrated in FIG. 1, when a driver of a host vehicle 105 wants to overtake a slow moving vehicle 110, a boost in acceleration is requested to increase the velocity of the host vehicle 105. In a host vehicle 105 equipped with an adaptive cruise control system, this same behavior is replicated by the adaptive cruise control system as an overtake acceleration boost. In some adaptive cruise control systems, a plurality of checks may be performed before an overtake acceleration boost is provided. An as example, the adaptive cruise control system may not apply an overtake acceleration boost when the neighboring vehicle 115 is located within a blind spot of the host vehicle 105, as illustrated in the example driving situation 200 of FIG. 2.

Figure 3:
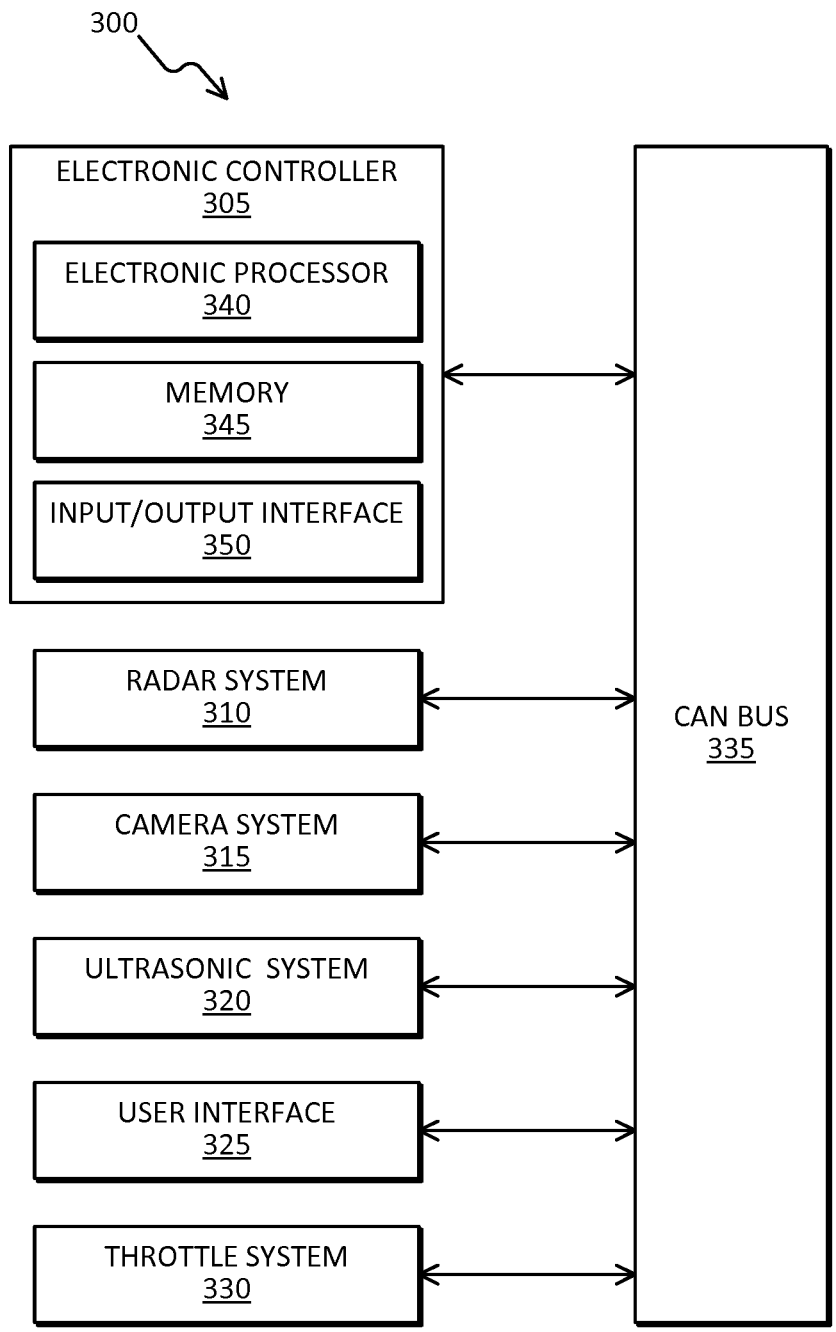
FIG. 3 is diagram of an adaptive cruise control system, in accordance with some embodiments.

FIG. 3 is an example embodiment of an adaptive cruise control system 300. In the embodiment illustrated, the adaptive cruise control system 300 includes an electronic controller 305 (for example, an electronic control unit (ECU)), a radar system 310, a camera system 315, an ultrasonic system 320, a user interface 325, and a throttle system 330. In alternate embodiments, the adaptive cruise control system 300 may include fewer or additional components in configurations different from the configuration illustrated in FIG. 3. In some embodiments, the adaptive cruise control system 300 may include the ultrasonic system 320 and one non-ultrasonic sensing system. For example, the adaptive cruise control system 300 may include the ultrasonic system 320 and the radar system 310, but not the camera system 315.

The electronic controller 305, the radar system 310, and the various other components of the adaptive cruise control system 300 communicate with each over one or more communication buses (for example, over a vehicle communication bus, such as the controller area network (CAN) bus 335 illustrated in FIG. 3).

The electronic controller 305 includes, among other things, an electronic processor 340 (for example, a microprocessor), memory 345, and an input/output interface 350. The electronic processor 340, the memory 345, the input/output interface 350, as well as other various modules (not shown) are coupled via a bus, or are coupled directly, by one or more additional control or data buses, or a combination thereof. The memory 345 includes, for example, read only memory (ROM), random access memory (RAM), an electrically erasable programmable read-only memory (EEPROM), other non-transitory computer-readable media, or a combination thereof. The electronic processor 340 is configured to retrieve program instructions and data from the memory 345 and execute, among other things, instructions to perform the methods described herein. Alternatively of in addition, the memory 345 is included in the electronic processor 340. The input/output interface 350 includes routines for transferring information between components within the electronic controller 305 and other components of the adaptive cruise control system 300.

The electronic controller 305 receives sensor data from the radar system 310, the camera system 315, and the ultrasonic system 320. The radar system 310 includes at least one radar sensor. The camera system 315 includes at least one camera and, in some embodiments, an imaging processing system that performs operations such as distortion correction on image data captured by the at least one camera. The ultrasonic system 320 includes at least one ultrasonic sensor. The electronic controller 305 analyzes the sensor data from the radar system 310, the camera system 315, and the ultrasonic system 320 to determine the locations of objects located around the host vehicle 105 (for example, the slow moving vehicle 110 and the neighboring vehicle 115).

The user interface 325 is included to control, among other things, the operation of the adaptive cruise control system 300. In some embodiments, the electronic controller 305 receives an input from the user interface 325 indicating an overtake request. The user interface 325 can include any combination of digital and analog input devices required to achieve a desired level of control for the adaptive cruise control system 300. For example, the user interface 325 can include a display, a camera, a speaker, a plurality of knobs, dials, switches, buttons, and the like. In some embodiments, the user interface 325 includes a touch-sensitive interface (for example, a touch-screen display) that displays visual output generated by software applications executed by the electronic processor 340. Visual output includes, for example, graphical indicators, lights, colors, text, images, graphical user interfaces (GUIs), combinations of the foregoing, and the like. The touch-sensitive interface includes a suitable display mechanism for displaying the visual output (for example, a light-emitting diode (LED) screen, a liquid crystal display (LCD) screen, and the like). The touch-sensitive interface also receives user input using detected physical contact (for example, detected capacitance or resistance). Based on the user input, the touch-sensitive interface outputs signals to the electronic processor 340 which indicate positions on the touch-sensitive interface currently being selected by physical contact.

The throttle system 330 (for example, a powertrain) delivers driving power to the wheels of the host vehicle 105. In some embodiments, the adaptive cruise control system 300 actuates the throttle system 330 of the host vehicle 105 to provide an overtake acceleration boost necessary to overtake, for example, the slow moving vehicle 110.

Figure 4A:
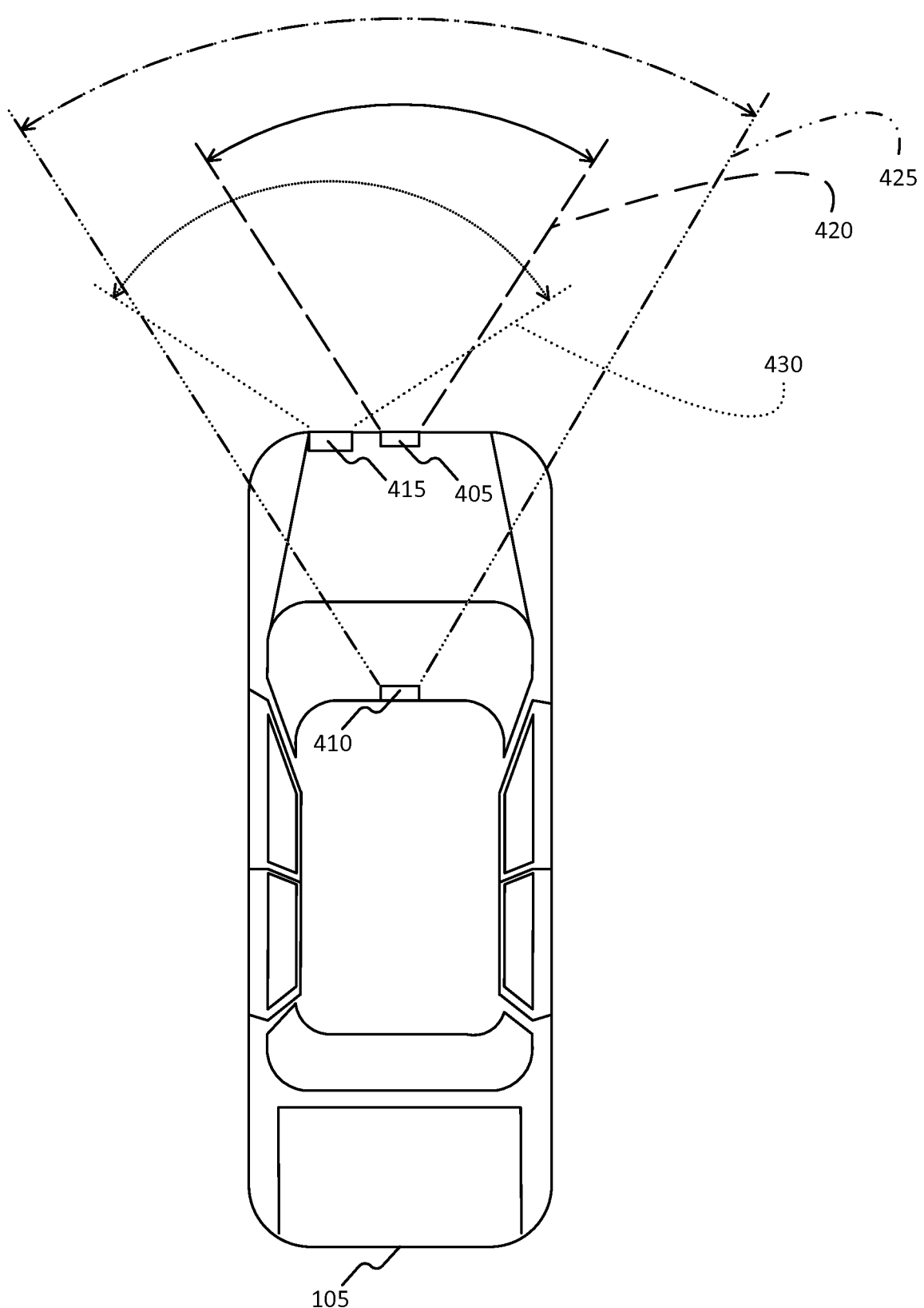
FIG. 4A is a diagram of a host vehicle including the adaptive cruise control system of FIG. 3, in accordance with some embodiments.

FIG. 4A illustrates the host vehicle 105 equipped with one example embodiment of the adaptive cruise control system 300. In the illustrated embodiment, the adaptive cruise control system 300 includes a radar sensor 405, a camera 410, and an ultrasonic sensor 415.

The radar sensor 405 is positioned toward the front end of the host vehicle 105 (for example, on or near the front bumper). The radar sensor 405 detects objects (for example, other vehicles) within a field-of-view 420, as illustrated in FIG. 4A. The camera 410 is also positioned toward the front end of the host vehicle 105. In some embodiments, as illustrated in FIG. 4, the camera 410 is positioned in the vicinity of a mounting base of a rearview mirror on the upper end of a front window of the host vehicle 105. The camera 410 detects objects (for example, other vehicles) within a field-of-view 425, as illustrated in FIG. 4A. The ultrasonic sensor 415 is also positioned toward the front end of the host vehicle 105 (for example, on or near the front bumper). The ultrasonic sensor 415 detects objects (for example, other vehicles) within a field-of-view 430, as illustrated in FIG. 4A.

In some embodiments, the field-of-view 420 of the radar sensor 405, the field-of-view 425 of the camera 410, and the field-of-view 430 of the ultrasonic sensor 415 are different. For example, the field-of-view 425 of the camera 410 may be greater than the field-of-view 420 of the radar sensor 405, as illustrated in FIG. 4A. Further, the field-of-view 430 of the ultrasonic sensor 415 may be greater than the field-of-view 420 of the radar sensor 405 and the field-of-view 425 of the camera 410, as illustrated in FIG. 4A.

In alternate embodiments, the adaptive cruise control system 300 may include fewer or additional components in configurations different from the configuration illustrated in FIG. 4A. For example, the adaptive cruise control system 300 may include more than one radar sensor 405, more than one camera 410, and more than one ultrasonic sensor 415. As a further example, the ultrasonic sensor 415 may be positioned on different locations of the host vehicle 105 other than the position illustrated in FIG. 4A.

Figure 4B:
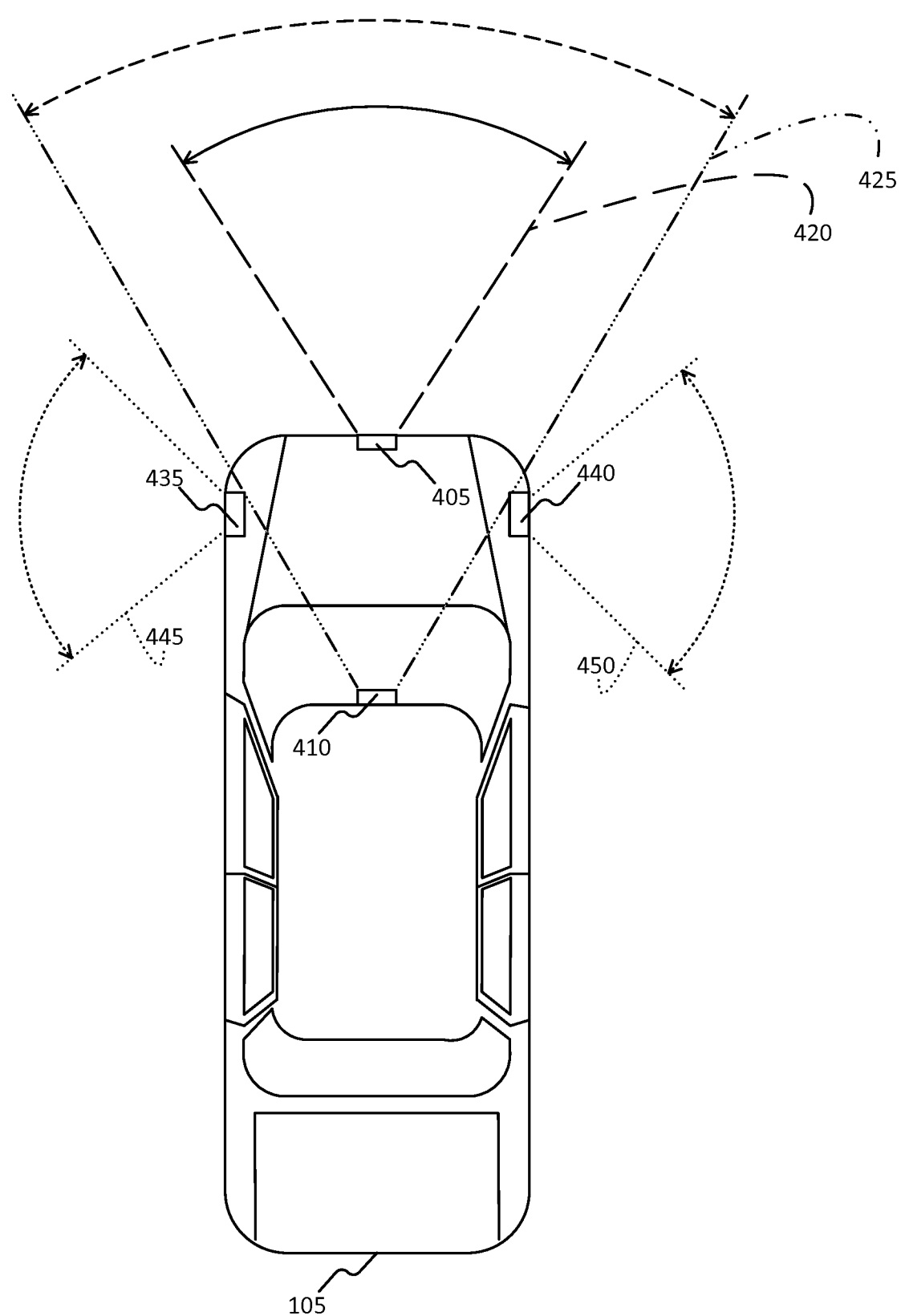
FIG. 4B is a diagram of a host vehicle including the adaptive cruise control system of FIG. 3, in accordance with some embodiments.

FIG. 4B illustrates the host vehicle 105 equipped with another example embodiment of the adaptive cruise control system 300. In the illustrated embodiment, the adaptive cruise control system 300 includes the radar sensor 405, the camera 410, a first ultrasonic sensor 435, and a second ultrasonic sensor 440. The first ultrasonic sensor 435 and the second ultrasonic sensor 440 are positioned, respectively, on the left and right sides of the host vehicle 105 toward the front end (for example, near the front bumper). The first ultrasonic sensor 435 detects objects (for example, other vehicles) within a field-of-view 445 on the left side of the host vehicle 105, as illustrated in FIG. 4B. The second ultrasonic sensor 440 detects objects (for example, other vehicles) within a field-of-view 450 on the right side of the host vehicle 105, as illustrated in FIG. 4B.

Figure 5:
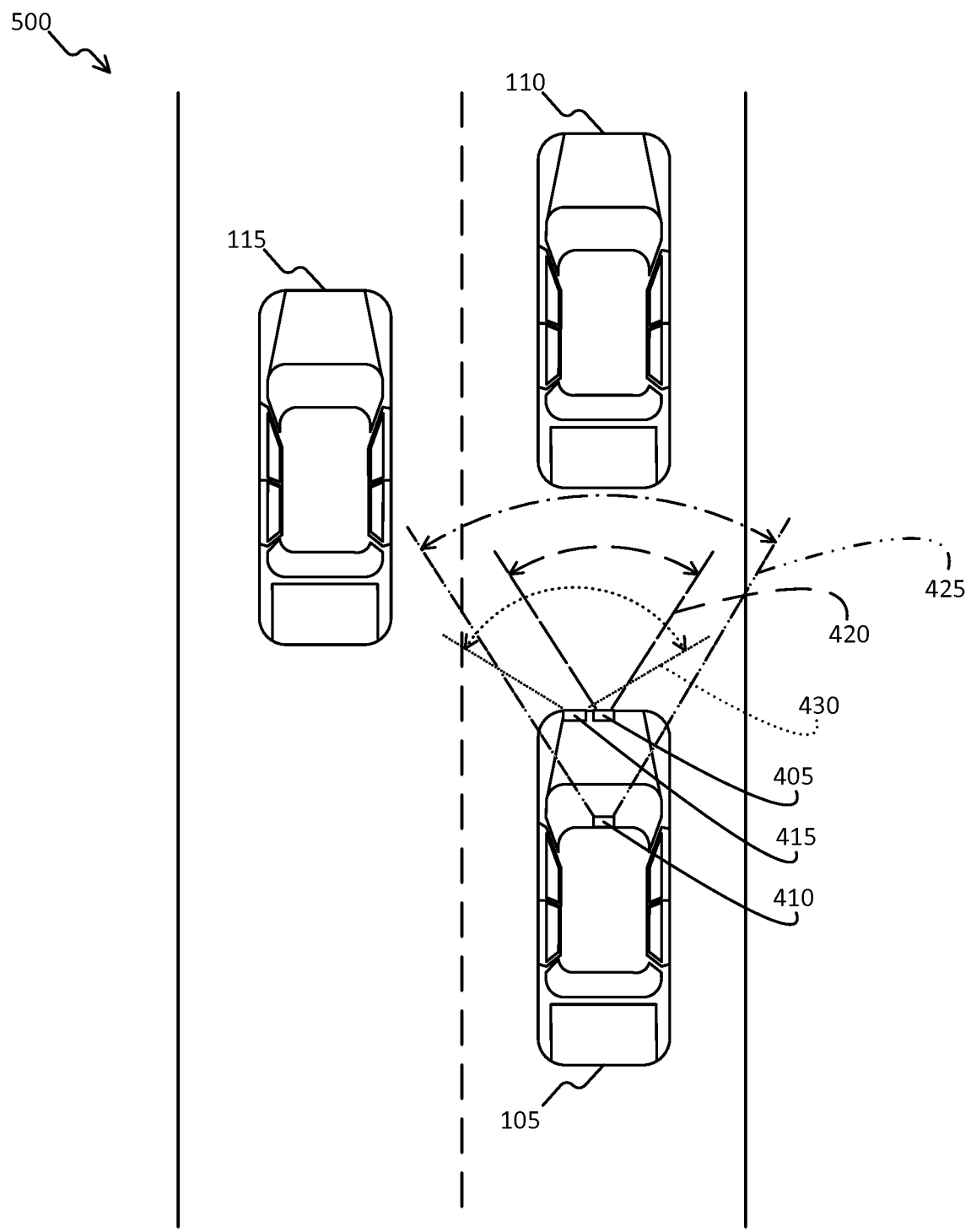
FIG. 5 is a diagram of a driving situation in which a neighboring vehicle is located within the fields-of-view of multiple sensors of a host vehicle.

FIG. 5 illustrates an example driving situation 500 in which the neighboring vehicle 115 is located within the field-of-view 420 of the radar sensor 405, the field-of-view 425 of the camera 410, and the field-of-view 430 of the ultrasonic sensor 415. The adaptive cruise control system 300 of the host vehicle 105 uses sensor data collected by the radar sensor 405, the camera 410, and the ultrasonic sensor 415 to track and determine the velocity of the neighboring vehicle 115. Combining the field-of-view 420 of the radar sensor 405, the field-of-view 425 of the camera 410, and the field-of-view 430 of the ultrasonic sensor 415 results in more accurate detection of the neighboring vehicle 115 which improves the performance of the adaptive cruise control system 300.

Figure 6:
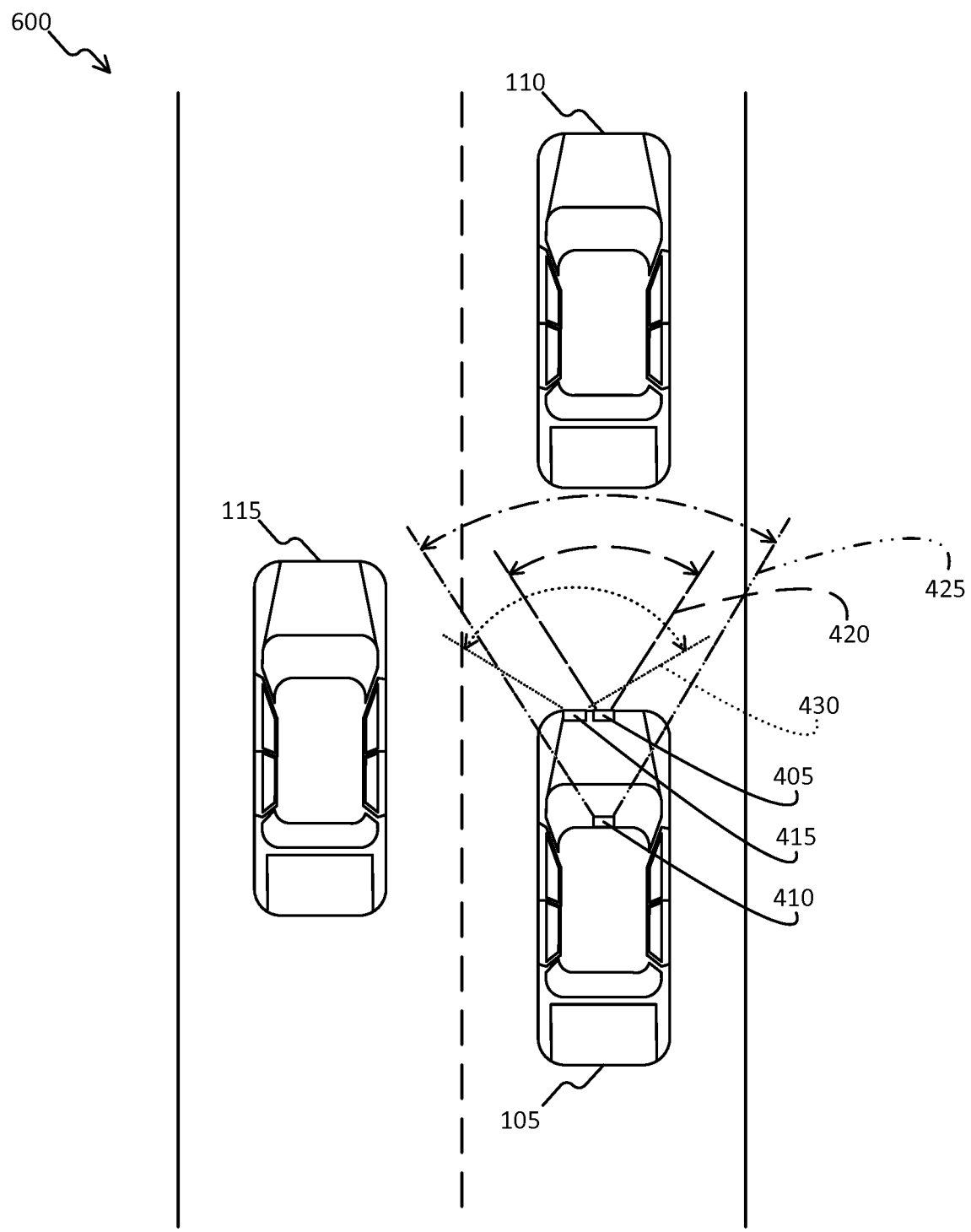
FIG. 6 is a diagram of a driving situation in which a neighboring vehicle is located within the field-of-view of an ultrasonic sensor of a host vehicle.

FIG. 6 illustrates an example driving situation 600 in which the neighboring vehicle 115 is located within the field-of-view 430 of the ultrasonic sensor 415, but outside of the field-of-view 420 of the radar sensor 405 and the field-of-view 425 of the camera 410. In some embodiments, the adaptive cruise control system 300 of the host vehicle 105 cancels the overtake request without applying an overtake acceleration boost when the neighboring vehicle 115 is detected by the ultrasonic sensor 415, but not by the radar sensor 405 or the camera 410.

Figure 7:
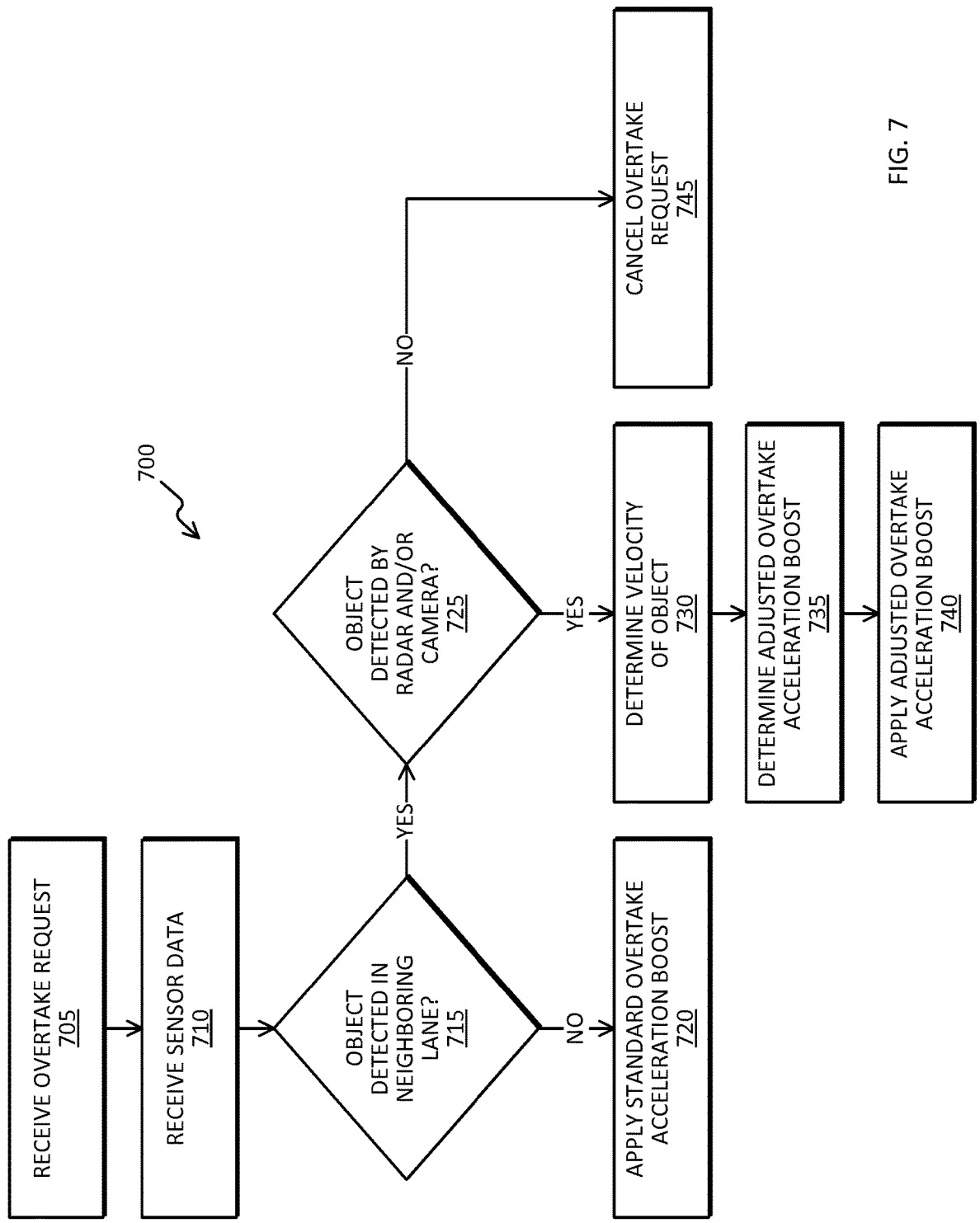
FIG. 7 is a flowchart of a method of providing overtake acceleration aid in a host vehicle, in accordance with some embodiments.

FIG. 7 is one example method 700 of providing overtake acceleration aid to the host vehicle 105. At block 705, the electronic controller 305 receives input indicating an overtake request. In some embodiments, the electronic controller 305 receives the overtake request from the user interface 325. For example, the user interface 325 sends input indicating an overtake request to the electronic controller 305 responsive to a driver of the host vehicle 105 selecting a virtual button displayed on a touch-screen display included in the user interface 325. Alternatively or in addition, the electronic controller 305 receives the overtake request from a separate control component of the host vehicle 105, such as a turn signal lever.

Responsive to receiving the input, the electronic controller 305 receives sensor data from the radar system 310, the camera system 315, and the ultrasonic system 320 (at block 710). The sensor data received from the ultrasonic system 320 can include data (for example, first data) that indicates the presence (and locations) of objects located within the field-of-view 430 of the ultrasonic sensor 415. The sensor data received from the radar system 310 can include data (for example, second data) that indicates the presence (and locations) of objects located within the field-of-view 420 of the radar sensor 405. The sensor data received from the camera system 315 can include data (for example, third data) that indicates the presence (and locations) of objects located within the field-of-view 425 of the camera 410.

At block 715, the electronic controller 305 determines whether an object (for example, a vehicle) is located in the neighboring lane. The electronic controller 305 makes this determination based at least in part on the sensor data received from the radar system 310, the camera system 315, the ultrasonic system 320, or a combination thereof.

When no object is detected in the neighboring lane (i.e., the neighboring lane is clear), the adaptive cruise control system 300 applies a standard overtake acceleration boost to the host vehicle 105 via the throttle system 330 (at block 720). In some embodiments, the electronic controller 305 sends a signal to the throttle system 330 which causes the throttle system 330 to increase the amount of driving force applied to the wheels of the host vehicle 105 by a predetermined amount. Alternatively or in addition, the electronic controller 305 determines the standard overtake acceleration boost based on, for example, the velocity of a vehicle in front on the host vehicle 105. For example, the electronic controller 305 determines the standard overtake acceleration boost such that the velocity of host vehicle 105 will increase to a value that is a predetermined amount greater than the velocity of the slow moving vehicle 110 which the host vehicle 105 intends to overtake.

Alternatively, when an object is detected in the neighboring lane, the electronic controller 305 determines whether the radar system 310 and/or the camera system 315 are detecting the object in the neighboring lane (at block 725). In some situations, only the ultrasonic system 320 is able to detect an object in the neighboring lane. For example, as illustrated in FIG. 6, the ultrasonic sensor 415 is able to detect the neighboring vehicle 115 in the neighboring lane because the neighboring vehicle 115 is located within the field-of-view 430 of the ultrasonic sensor 415. However, the radar sensor 405 and the camera 410 are unable to detect the neighboring vehicle 115 in the neighboring lane because the neighboring vehicle 115 is positioned outside of the field-of-view 420 of the radar sensor 405 and the field-of-view 425 of the camera 410.

When the radar system 310 and/or the camera system 315 are detecting the object in the neighboring lane, the electronic controller 305 determines a velocity of the object in the neighboring lane (at block 730). In some embodiments, the electronic controller 305 determines the velocity of the object in neighboring lane based at least in part on the sensor data received from the radar system 310, the camera system 315, the ultrasonic system 320, or a combination thereof.

At block 735, the electronic controller 305 determines an adjusted overtake acceleration boost based at least in part on the velocity of the object in neighboring lane. The adjusted overtake acceleration boost is great enough to overtake a vehicle located in front of the host vehicle 105, but low enough to prevent the host vehicle 105 from colliding with the object located in the neighboring lane. For example, referring to the parking situation illustrated in FIG. 5, the electronic controller 305 determines the velocity of the neighboring vehicle 115 based on the sensor data received from the radar sensor 405, the camera 410, and the ultrasonic sensor 415. The electronic controller 305 then determines an adjusted overtake acceleration boost such that host vehicle 105 will travel fast enough to overtake the slow moving vehicle 110, but not so fast that the host vehicle 105 will collide with the neighboring vehicle 115.

At block 740, the adaptive cruise control system 300 applies the adjusted overtake acceleration boost to the host vehicle 105. In some embodiments, the electronic controller 305 sends a signal to the throttle system 330 which causes the throttle system 330 to increase the amount of driving force applied to the wheels of the host vehicle 105 based on the adjusted overtake acceleration boost.

Returning to block 725, alternatively, when the radar system 310 and/or the camera system 315 are not detecting the object in the neighboring lane, the electronic controller 305 cancels the overtake request without applying an overtake acceleration boost (at block 745). In other words, the adaptive cruise control system 300 does not apply an overtake acceleration boost when the object in the neighboring lane is detected only by the ultrasonic system 320 and not also by either the radar system 310 or the camera system 315. In driving situations where only the ultrasonic system 320 is able to detect an object in a neighboring lane, the object may be located in a position such that the object blocks the host vehicle 105 from entering the neighboring lane. For example, as illustrated in FIG. 6, the neighboring vehicle 115 is located such that it is blocking the host vehicle 105 from entering the neighboring lane. Also, as illustrated in FIG. 6, the neighboring vehicle 115 is located only within the field-of-view 430 of the ultrasonic sensor 415. In some embodiments, the adaptive cruise control system 300 generates an alert signal when an object is detected in the neighboring lane by only the ultrasonic system 320. For example, the user interface 325 generates an audible and/or visual alert signal to the driver of the host vehicle 105 when an object is detected in the neighboring lane by only the ultrasonic system 320.

Thus, various embodiments include, among other things, methods and systems for providing overtake acceleration aid in vehicles. Various embodiments and features are set forth in the following claims.

What is claimed is:

1. An adaptive cruise control system for a host vehicle, comprising:
    an ultrasonic sensor configured to sense within a first field-of-view of a neighboring lane and generate first data;
    a radar sensor configured to sense within a second field-of-view of the neighboring lane;
    a camera configured to sense within a third field-of-view of the neighboring lane; and
    an electronic controller configured to
        receive an input indicating an overtake request, and responsive to receiving the input
            determine when an object is located in the neighboring lane based in part on the first data received from the ultrasonic sensor,
            determine a velocity of the object when the object is located within at least one selected from a group consisting of the second field-of-view of the neighboring lane and the third field-of-view of the neighboring lane,
            determine a first overtake acceleration boost based in part on the velocity of the object, wherein the first overtake acceleration boost is determined such the host vehicle will travel fast enough to overtake a slow moving vehicle located in front of the host vehicle but not so fast that the host vehicle will collide with the object located in the neighboring lane, and
            apply the first overtake acceleration boost to the host vehicle via a throttle system of the host vehicle.

2. The adaptive cruise control system of claim 1, wherein the electronic controller is further configured to
    apply a second overtake acceleration boost to the host vehicle via the throttle system when the neighboring lane is clear, wherein the second overtake acceleration boost is determined such the host vehicle will travel fast enough to overtake the slow moving vehicle located in front of the host vehicle.

3. The adaptive cruise control system of claim 2, wherein the electronic controller is further configured to
    cancel the overtake request without applying the first overtake acceleration boost or the second overtake acceleration boost when the object is
        located within the first field-of-view of the neighboring lane,
        not located within the second field-of-view of the neighboring lane, and
        not located within the third field-of-view of the neighboring lane.

4. The adaptive cruise control system of claim 1, wherein the radar sensor is further configured to generate second data, wherein the camera is further configured to generate third data, and wherein the electronic controller determines the velocity of the object based in part on the first data received from the ultrasonic sensor, the second data received from the radar sensor, and the third data received from the camera.

5. The adaptive cruise control system of claim 1, wherein the ultrasonic sensor, the radar sensor, and the camera are positioned toward a front end of the host vehicle.

6. The adaptive cruise control system of claim 1, wherein the ultrasonic sensor and the radar sensor are positioned on a front end of the host vehicle.

7. An adaptive cruise control system for a host vehicle, comprising:
    an ultrasonic sensor configured to sense within a first field-of-view of a neighboring lane and generate first data;
    a non-ultrasonic sensor configured to sense within a second field-of-view of the neighboring lane; and
    an electronic controller configured to
        receive an input indicating an overtake request, and responsive to receiving the input
            determine when an object is located within the neighboring lane based in part on the first data received from the ultrasonic sensor, and
            determine a velocity of the object when the object is located within the second field-of-view of the neighboring lane, determine a first overtake acceleration boost based in part on the velocity of the object, wherein the first overtake acceleration boost is determined such the host vehicle will travel fast enough to overtake a slow moving vehicle located in front of the host vehicle but not so fast that the host vehicle will collide with the object located in the neighboring lane, and apply the first overtake acceleration boost to the host vehicle via a throttle system of the host vehicle.

8. The adaptive cruise control system of claim 7, wherein the non-ultrasonic sensor including at least one selected from a group consisting of a radar sensor and a camera.

9. The adaptive cruise control system of claim 8, wherein the electronic controller is further configured to apply a second overtake acceleration boost to the host vehicle via the throttle system when the neighboring lane is clear, wherein the second overtake acceleration boost is determined such the host vehicle will travel fast enough to overtake the slow moving vehicle located in front of the host vehicle.

10. The adaptive cruise control system of claim 9, wherein the electronic controller is further configured to cancel the overtake request without applying the first overtake acceleration boost or the second overtake acceleration boost when the object is located within the first field-of-view of the neighboring lane, and not located within the second field-of-view of the neighboring lane.

11. The adaptive cruise control system of claim 8, wherein the non-ultrasonic sensor generates second data, and wherein the electronic controller determines the velocity of the object based in part on the first data received from the ultrasonic sensor and the second data received from the non-ultrasonic sensor.

12. The adaptive cruise control system of claim 8, wherein the ultrasonic sensor and the non-ultrasonic sensor are positioned toward a front end of the host vehicle.

13. The adaptive cruise control system of claim 8, wherein the ultrasonic sensor and the non-ultrasonic sensor are positioned on a front end of the host vehicle.

14. A method of providing overtake acceleration aid in a host vehicle, the method comprising:

receiving, with an electronic controller, an input indicating an overtake request;

receiving, with the electronic controller, first data from an ultrasonic sensor of the host vehicle and second data from a non-ultrasonic sensor of the host vehicle;

detecting, with the electronic controller, an object in a neighboring lane based in part on the first data;

determining, with the electronic controller, a velocity of the object when the object is detected by the non-ultrasonic sensor of the host vehicle;

determining, with the electronic controller, a first overtake acceleration boost based in part on the velocity of the object, wherein the first overtake acceleration boost is determined such the host vehicle will travel fast enough to overtake a slow moving vehicle located in front of the host vehicle but not so fast that the host vehicle will collide with the object located in the neighboring lane; and applying the first overtake acceleration boost to the host vehicle via a throttle system of the host vehicle.

15. The method of claim 14, wherein the non-ultrasonic sensor including at least one selected from a group consisting of a radar sensor and a camera.

16. The method of claim 14, further comprising applying a second overtake acceleration boost to the host vehicle via the throttle system when the neighboring lane is clear, wherein the second overtake acceleration boost is determined such the host vehicle will travel fast enough to overtake the slow moving vehicle located in front of the host vehicle.

17. The method of claim 16, further comprising cancelling the overtake request without applying the first overtake acceleration boost or the second overtake acceleration boost when the object is detected by the ultrasonic sensor, and not detected by the non-ultrasonic sensor.

18. The method of claim 15, wherein determining the velocity of the object includes determining the velocity of the object based in part on the first data received from the ultrasonic sensor and the second data received from the non-ultrasonic sensor.

19. The adaptive cruise control system of claim 1, wherein the electronic controller is further configured to apply the first overtake acceleration boost to the host vehicle via the throttle system only when both the ultrasonic sensor and at least one of the radar sensor and the camera are detecting the object in the neighboring lane.

20. The adaptive cruise control system of claim 7, wherein the electronic controller is further configured to apply the first overtake acceleration boost to the host vehicle via the throttle system only when both the ultrasonic sensor and the non-ultrasonic sensor are detecting the object in the neighboring lane.

* * * * *